United States Patent
Wu et al.

(10) Patent No.: US 12,020,480 B2
(45) Date of Patent: Jun. 25, 2024

(54) COUNTERFACTUAL DEBIASING INFERENCE FOR COMPOSITIONAL ACTION RECOGNITION

(71) Applicant: International Business Machines Corporation, Armonk, NY (US)

(72) Inventors: Bo Wu, Cambridge, MA (US); Chuang Gan, Cambridge, MA (US); Pin-Yu Chen, White Plains, NY (US); Zhenfang Chen, Cambridge, MA (US); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 17/662,663

(22) Filed: May 10, 2022

(65) Prior Publication Data

US 2023/0368529 A1   Nov. 16, 2023

(51) Int. Cl.
*G06V 20/40*   (2022.01)
*G06V 10/80*   (2022.01)

(52) U.S. Cl.
CPC .......... *G06V 20/41* (2022.01); *G06V 10/806* (2022.01); *G06V 20/46* (2022.01)

(58) Field of Classification Search
CPC ...... G06V 20/41; G06V 10/806; G06V 20/46; G06V 10/84
See application file for complete search history.

(56) References Cited

U.S. PATENT DOCUMENTS

| | | | |
|---|---|---|---|
| 9,129,158 B1* | 9/2015 | Medasani | G06V 40/20 |
| 10,089,556 B1 | 10/2018 | Xu | |
| 2019/0318099 A1* | 10/2019 | Carvalho | G06N 3/08 |
| 2020/0074165 A1 | 3/2020 | Ghafoor | |
| 2022/0114417 A1* | 4/2022 | Dalli | G06N 3/042 |
| 2022/0384058 A1* | 12/2022 | Lee | G16H 20/10 |
| 2023/0009121 A1* | 1/2023 | Riemenschneider | G06F 18/2155 |

OTHER PUBLICATIONS

Baradel et al., "CoPhy: Counterfactual Learning of Physical Dynamics", arXiv:1909.12000v2 [cs.CV] Apr. 7, 2020, 14 pages.
(Continued)

*Primary Examiner* — Dhaval V Patel
(74) *Attorney, Agent, or Firm* — Randy Tejeda

(57) ABSTRACT

One or more computer processors improve action recognition by removing inference introduced by visual appearances of objects within a received video segment. The one or more computer processors extract appearance information and structure information from a received video segment. The one or more computer processors calculate a factual inference (TE) for the received video segment utilizing the extracted appearance information and structure information. The one or more computer processors calculate a counterfactual debiasing inference (NDE) for the received video segment. The one or more computer processors calculate a total indirect effect (TIE) by subtracting the calculated counterfactual debiased inference from the calculated factual inference. The one or more computer processors action recognize the received video segment by selecting a classification result associated with a highest calculated TIE.

20 Claims, 13 Drawing Sheets

(56) References Cited

OTHER PUBLICATIONS

Chen et al., "Spatial-temporal Causal Inference for Partial Image-to-video Adaptation", In Proceedings of the AAAI Conference on Artificial Intelligence, Copyright 2021, 9 pages.

Choi et al., "Why Can't I Dance in the Mall? Learning to Mitigate Scene Bias in Action Recognition", arXiv:1912.05534v1 [cs.CV] Dec. 11, 2019, 13 pages.

Kim et al., "SAFCAR: Structured Attention Fusion for Compositional Action Recognition", arXiv:2012.02109v2 [cs.CV] Dec. 17, 2020, 11 pages.

Materzynska et al., Something-Else: Compositional Action Recognition with Spatial-Temporal Interaction Networks, arXiv:1912.09930v3 [cs.CV] Sep. 12, 2020, 11 pages.

Sun et al., Counterfactual Debiasing Inference for Compositional Action Recognition, Grace Period Disclosure, 2021, https://dl.acm.org/doi/10.1145/3474085.3475472>, 9 pages.

Tang et al., "Unbiased Scene Graph Generation from Biased Training", In Proceedings of the IEEE/CVF Conference on Computer Vision and Pattern Recognition, 2020, 10 pages.

Veytsman, Boris, Latex Class for the Association for Computing Machinery, 2016-2021, Association for Computing Machinery, May 1, 2021, v1.78, 135 pages.

Yan et al., Interactive Fusion of Multi-level Features for Compositional Activity Recognition, arXiv:2012.05689v1 [cs. CV] Dec. 10, 2020, 10 pages.

Yun et al., CutMix: Regularization Strategy to Train Strong Classifiers with Localizable Features, arXiv:1905.04899v2 [cs.CV] Aug. 7, 2019, 14 pages.

Zhang et al., "What If We Could Not See? Counterfactual Analysis for Egocentric Action Anticipation", Proceedings of the Thirtieth International Joint Conference on Artificial Intelligence (IJCAI-21), 7 pages.

Zhang et al., "mixup: Beyond Empirical Risk Minimization", arXiv:1710.09412v2 [cs.LG] Apr. 27, 2018, 13 pages.

\* cited by examiner

| METHOD | ORIGINAL | I3D [3] WITH CUTMIX [48] | MIXUP [50] |
|---|---|---|---|
| IMAGE |  |  |  |
| TOP-1 (%) | 50.5 | 55.4 | 55.9 |
| TOP-5 (%) | 76.9 | 80.8 | 81.4 |

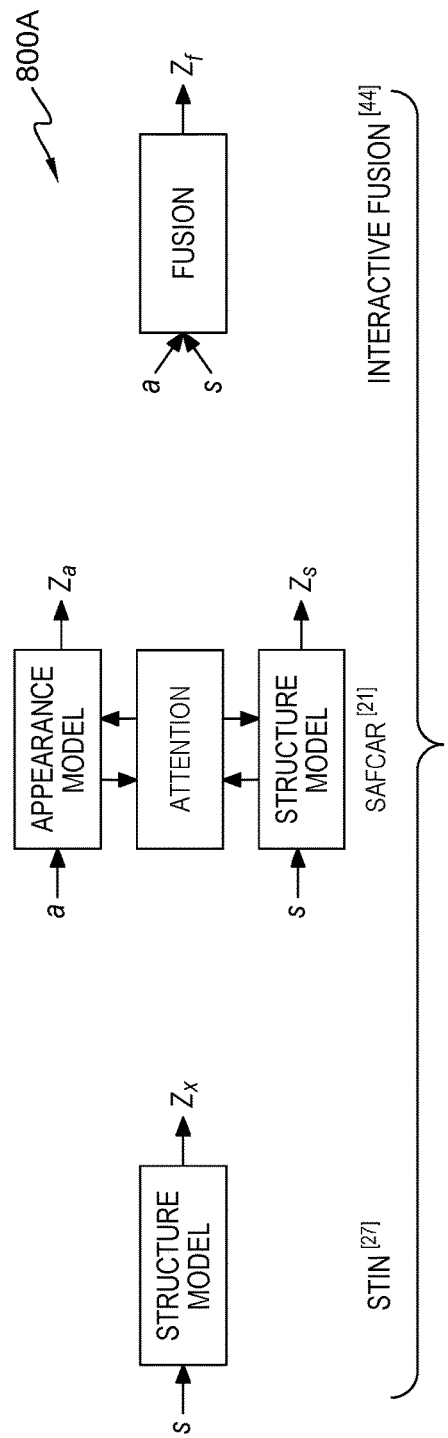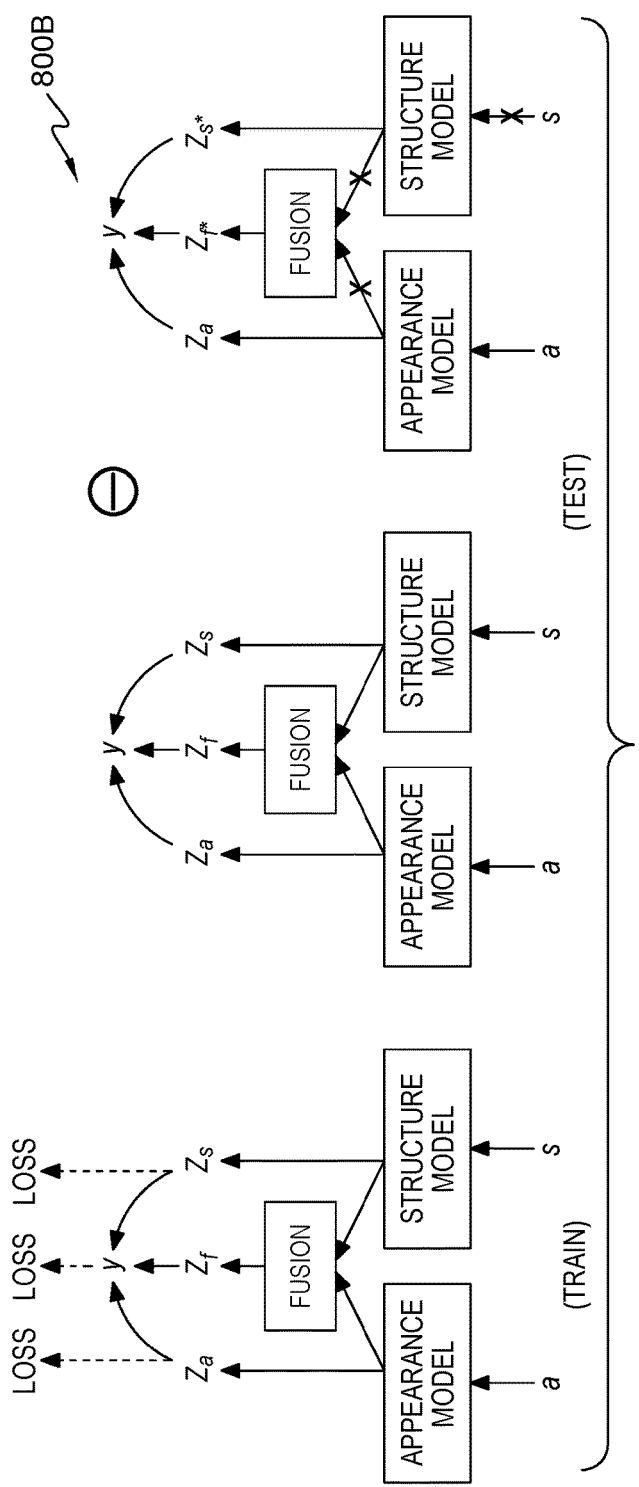
FIG. 8A
FIG. 8B

| METHOD | INPUT | | SOMETHING - ELSE | |
|---|---|---|---|---|
| | RGB | TRACK | TOP-1 (%) | TOP-5 (%) |
| I3D [3] | o | | 50.5 | 76.9 |
| STIN [27] | | o | 51.4 | 79.3 |
| STIN+I3D [27] | o | o | 54.6 | 79.4 |
| INTERACTIVE FUSION [44] | o | o | 59.6 | 85.8 |
| SAFCAR [21] | o | o | 60.5 | 84.3 |
| OUR CDN W/O CF | o | o | 62.8 | 87.3 |
| OUR CDN | o | o | 64.5 | 88.2 |

FIG. 9A

| METHOD | SOMETHING - ELSE | |
|---|---|---|
| | TOP-1 (%) | TOP-5 (%) |
| SINGLE APPEARANCE MODEL | 58.9 | 84.1 |
| SINGLE STRUCTURE MODEL | 53.8 | 80.5 |
| SINGLE FUSION MODULE | 34.0 | 63.6 |
| CDN W/O CF (NAIVE SUM) | 60.1 | 85.0 |
| CDN W/O CF (LOG-SIGMOID SUM) | 62.8 | 87.3 |
| CDN (NAIVE SUM) | 62.8 | 87.2 |
| CDN (LOG-SIGMOID SUM) | 64.5 | 88.2 |

FIG. 9B

COUNTERFACTUAL DEBIASING INFERENCE FOR COMPOSITIONAL ACTION RECOGNITION

STATEMENT REGARDING PRIOR DISCLOSURES BY THE INVENTOR OR A JOINT INVENTOR

The following disclosure(s) are submitted under 35 U.S.C. 102(b)(1)(A):

(i) Counterfactual Debiasing Inference for Compositional Action Recognition; Pengzhan Sun, Bo Wu, Xunsong Li, Wen Li, Lixin Duan, and Chuang Gan, Apr. 3, 2022.

BACKGROUND

The present invention relates generally to the field of machine learning, and more particularly to computer vision.

Causal inference has recently inspired a wide range of works in computer vision community, which includes scene graph generation, image recognition, video analysis, fewshot learning, zero-shot learning, semantic segmentation, and vision-language tasks. Among them, the idea of counterfactual reasoning has achieved promising results and advanced towards unbiased prediction in many tasks, especially in Visual Question Answering (VQA). The present invention recognizes that the types of bias between VQA and compositional action recognition are different. For compositional action recognition, the bias in the task comes from the combination distributions of verbs and nouns. Such bias from the composition is widespread in the real world and can hardly be avoided during dataset construction. In contrast, the bias in VQA comes from the imbalanced sample distribution of the dataset.

SUMMARY

Embodiments of the present invention disclose a computer-implemented method, a computer program product, and a system. The computer-implemented method includes one or more computer processers improving action recognition by removing inference introduced by visual appearances of objects within a received video segment. The one or more computer processors extract appearance information and structure information from a received video segment. The one or more computer processors calculate a factual inference (TE) for the received video segment utilizing the extracted appearance information and structure information. The one or more computer processors calculate a counterfactual debiasing inference (NDE) for the received video segment. The one or more computer processors calculate a total indirect effect (TIE) by subtracting the calculated counterfactual debiased inference from the calculated factual inference. The one or more computer processors action recognize the received video segment by selecting a classification result associated with a highest calculated TIE.

BRIEF DESCRIPTION OF THE DRAWINGS

FIGS. 8A and 8B depict operational steps of the program within the computational environment of FIG. 1, in accordance with an embodiment of the present invention;

FIGS. 9A and 9B illustrate graphs associated with the program within the computational environment of FIG. 1, in accordance with an embodiment of the present invention;

DETAILED DESCRIPTION

Figure 3:
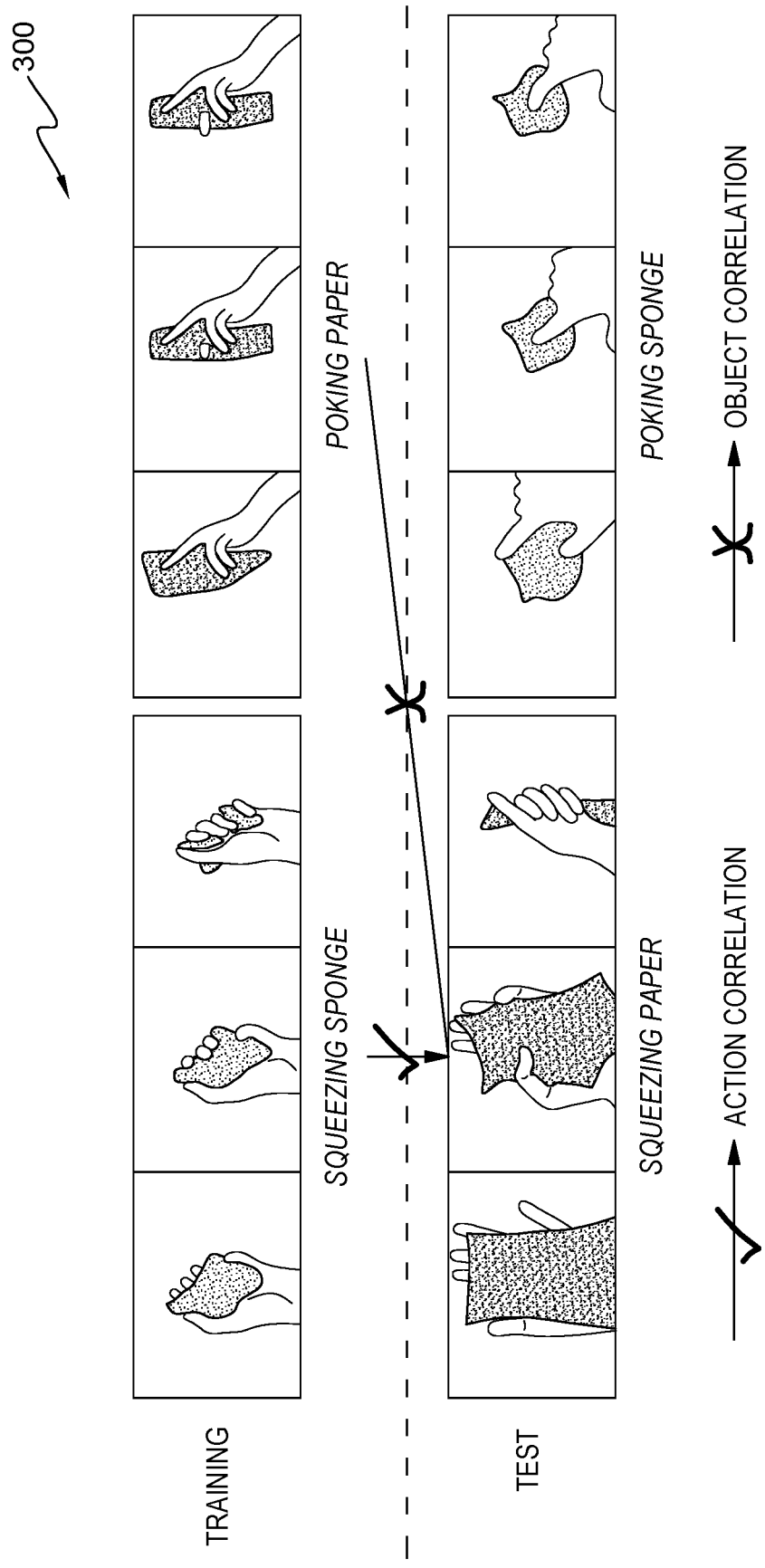
FIG. 3 depicts an illustrative embodiment of the program within the computational environment of FIG. 1, in accordance with an embodiment of the present invention.

Action recognition has received much attention in computer vision area for many years. Benefited from the distribution learning power of deep networks, mainstream action recognition models attempt to learn effective representations of observed dynamic actions from videos. Compositional action recognition is a novel challenge in the computer vision community and focuses on revealing the different combinations of verbs and nouns instead of treating subject-object interactions in videos as individual instances. However, it is still difficult to recognize a seen action when facing never seen objects. In the setting of this task, combinations of an action and instances are not overlapped in the training set and the test set, as shown in FIG. 3. For existing action recognition methods, compositional action recognition is still an open issue due to relying heavily on the correlation between the visual features and the prediction results learned by data-driven methods. When instances and actions in given test samples combine in a way that the model has not seen before, a model will tend to produce wrong predictions based on prior distribution of seen visual clues. Existing methods tackle this challenging task by simply ignoring appearance information or fusing object appearances with dynamic instance tracklets, however, said strategies usually do not perform well for unseen action instances.

Compositional action recognition makes the combination of objects and actions disjoint between training and testing. This non-overlapping splitting leads to appearance bias becoming a major problem when learning actions. To tackle this issue, proposed Spatial-Temporal Interaction Network (STIN) represents actions by leveraging instance bounding boxes only to model the transformation of object geometric relations in both spatial and temporal domain. STIN generalizes well over some actions associated with object movements but fails to recognize actions about the intrinsic state changes of objects. To model such more complex actions, RGB information is introduced and fused with the spatio-temporal geometric information obtained from instance bounding boxes. Existing art designs an attention mechanism to fuse this structure information from instance bounding boxes and visual information from RGB frames. Additionally, existing art fuses said information in object-level and designs an auxiliary prediction task to guide the fusion process.

Existing art tackles said challenges by breaking the object appearance dependency when learning a dynamic interaction, inhibiting the co-occurrence bias in the same action with distinct objects. By capturing the instance tracklet of an action (a continuous set of bounding boxes coordinates), Spatial-Temporal Interaction Network (STIN) achieves comparable performance against convolutional neural networks trained for video classification (e.g., I3D). But the strategy fails when actions are associated more with the changes in terms of the intrinsic property of an object, such as "poking" and "tearing". Besides, there is another line of works insisting that visual information contains effective cues for compositional action recognition. Based on attention mechanism or the auxiliary prediction task, fusing appearance information and structure information brings observed improvements. However, the potential risk of appearance interference has not been solved positively in these fusion methods.

Embodiments of the present invention (i.e., Counterfactual Debiasing Network (CDN)), a novel learning framework, improve model generalization by removing interference introduced by visual appearances of objects or subjects. Embodiments of the present invention explicitly control the effect of instance appearance for compositional action recognition. Embodiments of the present invention learn appearance information in action representations and later remove the effect of such information in a causal inference manner. Specifically, embodiments of the present invention utilize tracklets and video content to model the factual inference by considering both appearance information and structure information. In contrast, only video content with appearance information is leveraged in the counterfactual inference. With the two inferences, embodiments of the present invention generate a causal graph, capturing and removing bias introduced by appearance information through the subtraction of the result of counterfactual inference from that of factual inference. Embodiments of the present invention mitigate appearance bias by conducting counterfactual debiasing inference based on generated causal graphs. Embodiments of the present invention recognize that accuracy is increased for unseen action instances by debiasing the effect of appearances.

Embodiments of the present invention, based on the counterfactual debiasing inference, recognize that action knowledge learned from instance appearance can be divided into two components in a causal graph; one component is the bias which can be represented by the direct effect of appearance information and the other component is an effective cue that can be captured by the indirect effect through fusion information on final prediction results. Embodiments of the present invention recognize that prior knowledge learned from appearance information mixed with spurious correlation between action and instance appearance inhibits model action learning. Embodiments of the present invention remove pure appearance effect from total effect by counterfactual debiasing inference on compositional action recognition. Embodiments of the present invention provide a new comprehension with the counterfactual debiasing inference perspective for compositional action recognition tasks due to spurious correlation from visual appearance when recognizing actions. Embodiments of the present invention achieve state-of-the-art performance for compositional action recognition. Implementation of embodiments of the invention may take a variety of forms, and exemplary implementation details are discussed subsequently with reference to the Figures.

The present invention will now be described in detail with reference to the Figures.

Figure 1:
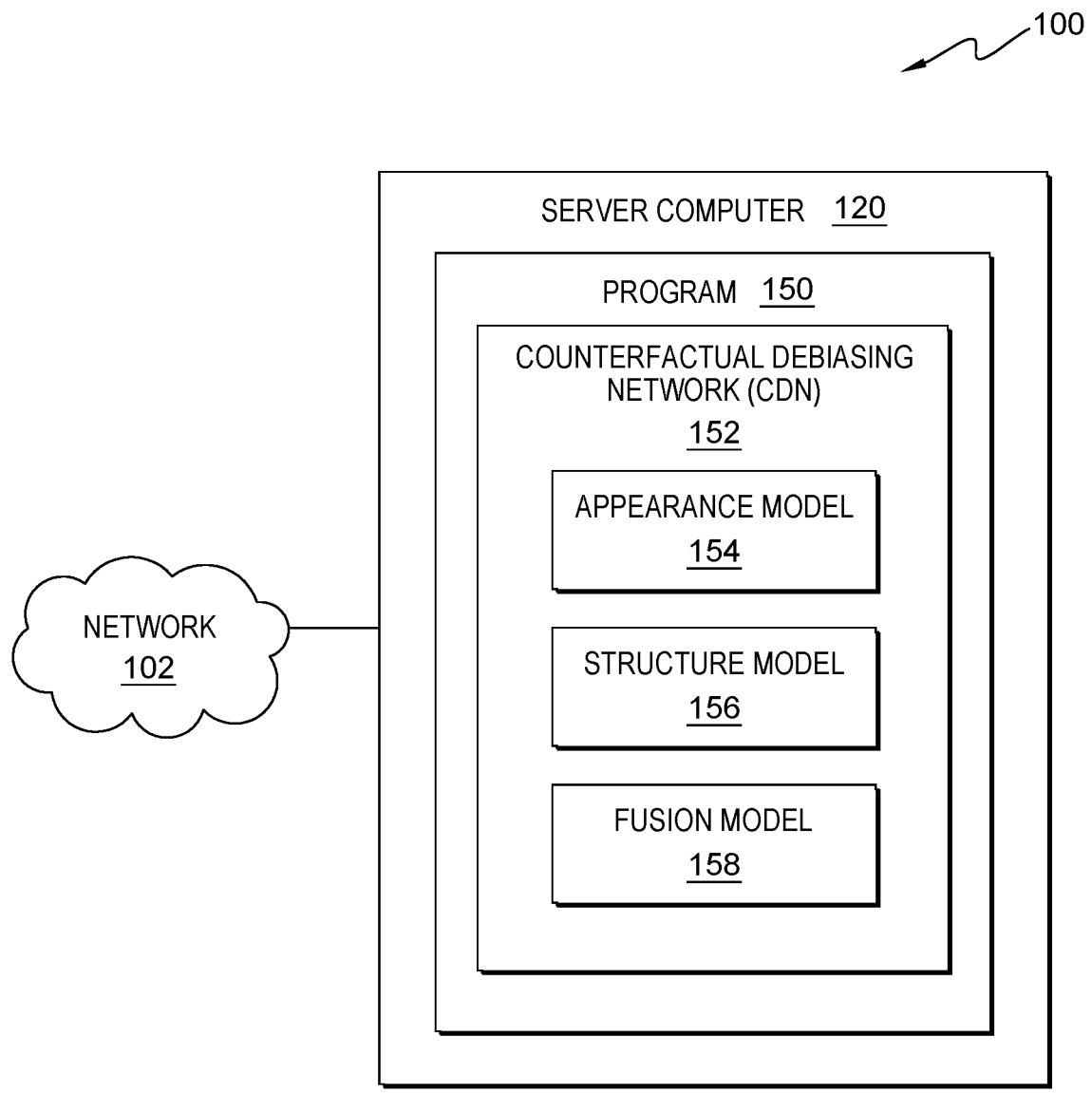
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections, and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes program 150. In other embodiments, server computer 120 may contain other applications, databases, programs, etc. which have not been depicted in computational environment 100. Server computer 120 may include internal and external hardware components, as depicted and described in further detail with respect to FIG. 13.

Program 150 is a program for compositional action recognition by counterfactual debiasing inference. In various embodiments, program 150 may implement the following steps: improve action recognition by removing inference introduced by visual appearances of objects within a received video segment; extract appearance information and structure information from a received video segment; calculate a factual inference (TE) for the received video segment utilizing the extracted appearance information and structure information; calculate a counterfactual debiasing inference (NDE) for the received video segment; calculate a total indirect effect (TIE) by subtracting the calculated counterfactual debiased inference from the calculated factual inference; and action recognize the received video segment by selecting a classification result associated with a highest calculated TIE. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes counterfactual debiasing network (CDN) 152 which further includes appearance model 154, structure model 156, and fusion module 158. Program 150 is depicted and described in further detail with respect to FIG. 2.

Counterfactual debiasing network (CDN) 152 is based on a causal graph built with any module so long as a corresponding output has the same semantic information. CDN 152 comprises appearance model 154, structure model 156, and fusion module 158. In the training of the comprised models and modules, CDN 152 adds two auxiliary loss items to stabilize the causal influence of each independent branch. Without these auxiliary loss items, said models converge to a single branch, which converges fastest, leading to other branch activations resulting in meaningless perturbations. The loss function can be formalized as follow: $\mathcal{L} = \mathcal{L}_F(a,s,f) + \mathcal{L}_A(a) + \mathcal{L}_S(s)$, where $\mathcal{L}_F(a, s, f)$, $\mathcal{L}_A(a)$, and $\mathcal{L}_S(s)$ are cross-entropy losses over $Z_{a,s,f}$, $Z_a$, and $Z_s$. More specifically, in the training stage, the classification result of CDN 152 comes from the joint contribution of appearance information A, structure information S, and fusion information F.

In an embodiment, the models comprised within CDN 152 are representative of a plurality of models that respectively utilize deep learning techniques to train, calculate weights, ingest inputs, and output a plurality of solution vectors (i.e., classifications). In an embodiment, CDN 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, CDN 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods.

In an embodiment, appearance model 154 (e.g., I3D) is a convolutional neural network model for video classification. In an embodiment, appearance model 154 or Node A (i.e., Appearance Backbone & Instance Appearance Information) is a video appearance feature extractor, where given a video sample V, where appearance model 154 outputs video-level appearance representation A: Input: {V}⇒Output: {A}, where A is aggregated from multiple instances' appearance feature. The appearance information of the instances contains useful contextual information and bias that can mislead the model; however, prior compositional action recognition methods can only choose to accept or reject appearance information. Appearance model 154 is further described within the flowchart of FIG. 2.

Structure model 156 or action structure module receives tracklets (instances in a video segment available through an object detector and a tracker) of instances as input and outputs action structure information S: Input: {V}⇒Output: {S}. Structure model 156 is further described within the flowchart of FIG. 2.

Fusion module 158 or Node F (Fusion Module & Video Fusion Information) aggregates the appearance information A and the structure information S of a video into the video fusion information F: Input: {A, S}⇒Output: {F}. In the depicted embodiment, fusion module 158 utilizes a concatenation operation followed with a multilayer perceptron (MLP). Fusion module 158 is further described within the flowchart of FIG. 2.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
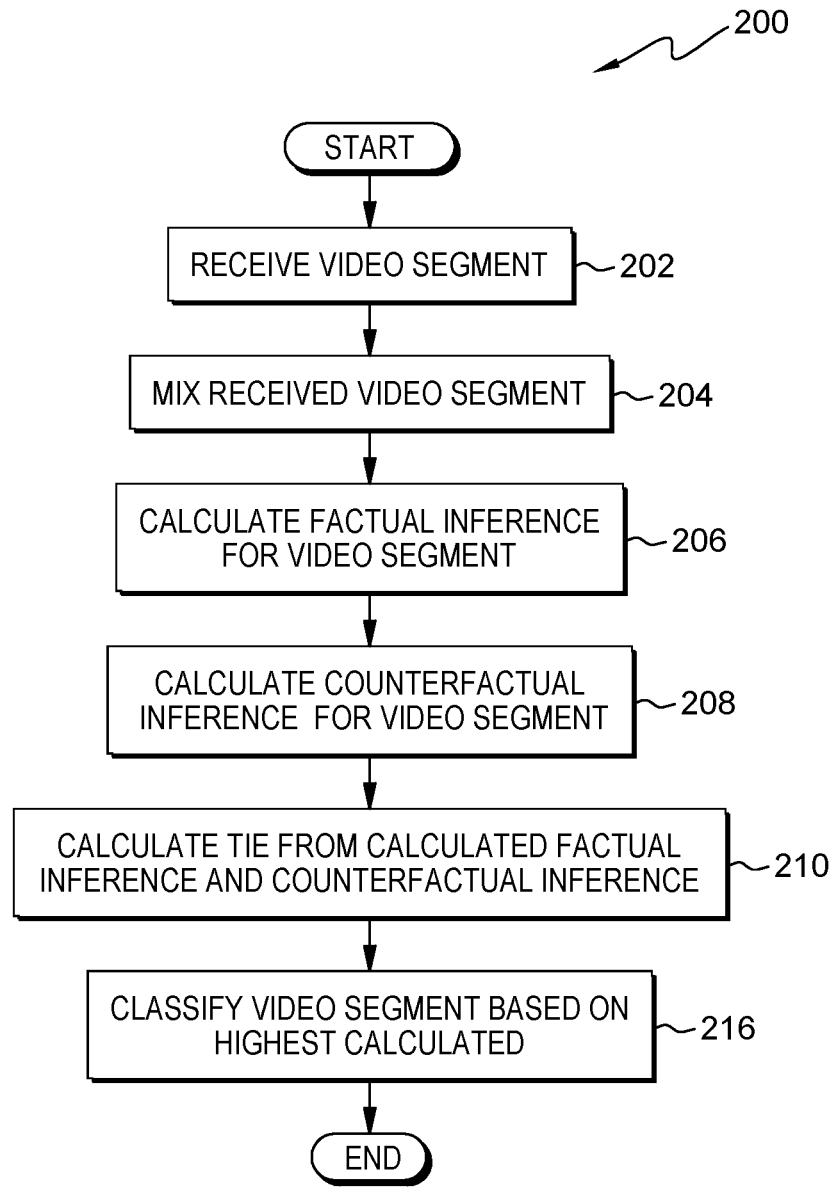
FIG. 2 is a flowchart depicting operational steps of a program, on a server computer within the computational environment of FIG. 1, for compositional action recognition by counterfactual debiasing inference, in accordance with an embodiment of the present invention.

FIG. 2 depicts flowchart 200 illustrating operational steps of program 150 for compositional action recognition by counterfactual debiasing inference, in accordance with an embodiment of the present invention.

Program 150 retrieves a video segment (step 202). In an embodiment, program 150 initiates or commences responsive to a retrieved or detected video segment. For example, program 150 utilizes a plurality of cameras, not depicted, contained in an exemplary vehicle to retrieve a plurality of video streams or segments. In an embodiment, responsive to a video segment, program 150 constructs, trains, or initiates CDN 152 and comprising models.

Program 150 mixes the received video segment (step 204). In an embodiment, program 150 breaks the correlation between object appearance and action categories by leveraging cut-mix (i.e., replacing regions with a patch from another image, while labels are mixed proportionally to the pixels of combined images) and mixup (i.e., convexly combining random pairs of images and associated labels) operations on the level of instances to explore the effect of object appearance on action predictions. In an embodiment, for an instance-level video sample, program 150 cuts each comprised object according to respective bounding box coordinates (e.g., spatiotemporal geometric information). In a further embodiment, program 150 randomly samples another object from a training set, resizes the sampled object, and pastes the resized object into the target video segment. In another embodiment, similarly, program 150 leverages mixup at an instance level. In an embodiment, program 150 sets the mixup weight as 0.5. The embodiments above result in the received video segment partitioned into mixed instances of tracklets and RGB frames corresponding to the received video segment. Tracklets of each instance depict how an object moves and interacts with other objects, which are abstract and essential representation of actions and provide critical cues for correct predictions. Tracklets denote unbiased information for action learning since object categories and visual information are not involved.

Program 150 calculates factual inference for the video segment (step 206). Program 150 utilizes appearance model 154 and structure model 156 to extract features (i.e., appearance information, action structure information, etc.) from tracklets and RBG frames associated with the video segment, as described in step 204. In an embodiment, program 150 constructs a causal graph with four variables which includes instance appearance information A, action structure information S, fusion information F, and model prediction Y, which is illustrated in FIG. 6A; a directed acyclic graph $\mathcal{G}=\{\mathcal{N}, \varepsilon\}$, showing how a set of variables interact with each other through causal effect links. Responsively, program 150 transposes appearance information and structure information to fusion module 158 to generate a better video-level representation. The effectiveness of fusion between appearance information and structure information is verified where a particular attention module guides the fusion process and leads to a better generalization ability for compositional action recognition. In an embodiment, program 150 utilizes bilinear pooling and attention mechanisms to fuse instance appearance information and action structure information. In the depicted embodiment, fusion module 158 utilizes a concatenation operation following with fully connected layers as the fusion module: Link{ $\mathcal{A}, \mathcal{S}, \mathcal{F}$ }→ $\mathcal{Y}$ (Classifiers): This procedure can be formalized as: Input: {A}⇒Output: {$Z_a$}, Input: {S}⇒Output: {$Z_s$}, Input: {F}⇒Output: {$Z_f$}, where $Z_a$, $Z_s$, and $Z_f$ are classification scores corresponding to A, S, and F mentioned above. $Z_a$ is a biased classification result, and the present invention reduces this bias in subsequent counterfactual debiasing inferences.

Program 150, then, calculates a final classification prediction score $Z_{a,s,f}$ by fusing all activations {$Z_a$, $Z_s$, and $Z_f$} using a score fusion function: Input: {$Z_a$, $Z_s$, and $Z_f$}⇒Ouput: {$Z_{a,s,f}$}. In an embodiment, program 150 utilizes two fusion functions: 1) Naive Sum: $Z_{a,s,f}=Z_a+Z_s+Z_f$ and Log-sigmoid Sum: $Z_{a,s,f}=\log(\sigma(Z_a+Z_s+Z_f))$, where $\sigma(\cdot)$ is the sigmoid function. Here, program 150 generates a factual inference (i.e., classification prediction) for the video segment.

Program 150 calculates counterfactual inference for the video segment (step 208). Program 150, concurrently, calculates a counterfactual inference for the video segment as the factual inference is calculated, as described in step 206. In an embodiment, counterfactual inference only considers RBG frames utilizing appearance model 154, excluding structural information and features. Here, program 150 utilizes counterfactual debiasing inference to exclude the pure instance appearance effect through A→Y to reduce appearance bias. The present invention denotes the appearance model, the structure model, and the fusion module as $M_A$, $M_S$ and $M_F$, respectively. Program 150 utilizes the formulations below, where a is a red, green, and blue (RGB) frame input and s is a tracklet input: $M_A(a)=\{Z_a, f_a\}$, $M_S(s)=\{Z_s, f_s\}$, $M_F(f_a, f_s)=Z_f$, where $f_a$ and $f_s$ represent features extracted from the appearance and structure backbone, respectively. The final score: $Z_{a,s,f}=h(Z_a+Z_s+Z_f)$, is gained by aggregating three paths activation directly connected to Y using a fusion function h. Here, the score fusion function is an indispensable part instead of an ensemble trick for CDN 152. Both the factual and counterfactual outcomes are calculated by the fusion function. Therefore, any model cannot give any output when using CF without the fusion function. For reference, program 150 provides the performance of each single model without fusion function and CF, as shown in FIG. 9B. In an embodiment, program 150 utilizes Naive Sum and Log-sigmoid Sum respectively to generate the final prediction results. In a further embodiment, program 150 only substitutes Naïve Sum function with Log-sigmoid Sum function, leading to a performance improvement, suggesting that the selection of score fusion function has a great impact on the final prediction results.

In an embodiment, program 150 denotes a random variable as a capital letter and represents the corresponding observed value as a lowercase letter. The lowercase letter with the superscript * represents under no-treatment control condition. For example, to recognize an action, A=a represents having observed instance appearance in this action video, then A=a* represents having not observed instance appearance. To capture the appearance bias, program 150 observes the causal effect of direct path A→Y when blocking the activation from other pathways. However, traditionally neural networks cannot make an inference when fed with variables of the dummy value. Therefore, program 150 manually sets the output to be a zero score for brevity instead of a learnable score when the model input is a dummy value. The setting can be formalized as:

$$Z_a = \begin{cases} z_a = M_A(a) & A = a \\ z_a^* = 0 & A = a^* \end{cases},$$

$$Z_s = \begin{cases} z_s = M_S(s) & S = s \\ z_s^* = 0 & S = s^* \end{cases},$$

$$Z_a = \begin{cases} z_f = M_F(f_a, f_s) & A = a \text{ and } S = s \\ z_f^* = 0 & A = a^* \text{ or } S = s^* \end{cases},$$

Total effect (TE) denotes the effect of individual and mediator together on the outcome, which can be decomposed as the sum of direct effect and indirect effect. Total effect of A=a and S=s on the classification result Y can be represented as: TE=$Z_{a,s,f}$−$Z_{a^*, s^*, f^*}$, where $Z_{a,s,f}$ is the inference outcome based on A=a and S=s, and $Z_{a^*,s^*,f^*}$ is the inference outcome based on A=a* and S=s*. According to the CDN 152, the effect of appearance information A on classification result Y can be divided into direct effect A→Y and indirect effect A→F→Y. Program 150 utilizes counterfactual debiasing inference to block the direct effect A→Y while retaining the indirect effect A→F→Y. Here, program 150 removes the bias while retaining context cues in appearance information. Natural direct effect (NDE) denotes the effect of an individual on the outcome with the blocked mediator. The direct effect of appearance information can be captured using NDE: $NDE=Z_{a,s^*,f^*}-Z_{a^*,s^*,f^*}$.

Figure 10:
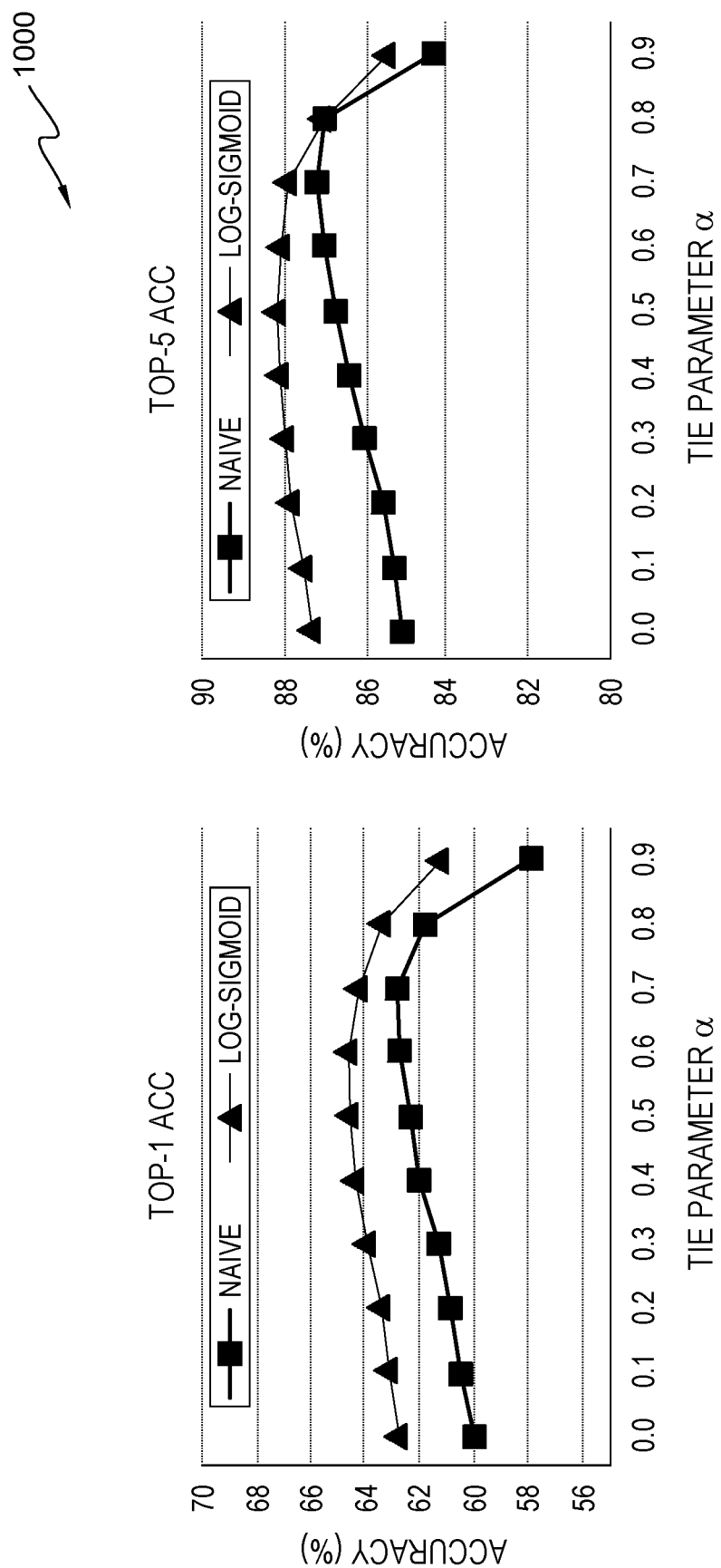
FIG. 10 illustrate graphs associated with the program within the computational environment of FIG. 1, in accordance with an embodiment of the present invention.

Program 150 calculates total indirect effect from the calculated factual inference and the calculated counterfactual interference (step 210). In an embodiment, program 150 calculates a total indirect effect by subtracting NDE from TE, as described in step 208. Here, program 150 subtracts counterfactual inference outcome (i.e., NDE) from factual inference outcome (i.e., TE) to eliminate visual bias and obtain a more reasonable and accurate result, total indirect effect (TIE): $TIE=TE-NDE=Z_{a,s,f}-Z_{a,s^*,f^*}$. In another embodiment, program 150 adjusts a hyperparameter $\alpha$ to control the proportion of NDE that is removed from TE. Here, program 150 controls the trade-off between total indirect effect and total effect. The higher value of $\alpha$, the less dependent on appearance information of model prediction results. In an embodiment, program 150 adjusts $\alpha$ to 0, total indirect effect on classification results Z degenerates into total effect, which is equivalent to results gained from traditional inference strategies based on posterior probability. As program 150 increases a from 0 to 1, the performance of CDN 152 first increases and drops down around $\alpha=0.7$ as shown in FIG. 10. In the depicted embodiment, program 150 selects $\alpha=0.5$ for Log-sigmoid Sum score fusion function and $\alpha=0.7$ for Naive Sum. By searching for a proper value of $\alpha$, CDN 152 succeeds in mitigating the bias while maintaining context in appearance information. This further illustrates that a compromise between learning action knowledge from visual information and totally discarding visual cues is the most reasonable solution for compositional action recognition.

Program 150 classifies video segment based on highest calculated total indirect effect (TIE) (step 212). In an embodiment, program 150 selects the classification result with the highest TIE. For example, program 150 classifies or categories a live video segment depicting a user (i.e., subject) interacting with complex tools (i.e., objects) based on the highest calculated TIE, as described in step 210. In this example, program 150 observes, records, or receives streaming video segments of the user operating factory equipment. Here, program 150 utilizes the generated classifications to provide instructions or aid to the user. In another example, program 150 classifies that the user is incorrectly operating a tool and provides additional auditory or written instruction to the user to correctly operate the tool. In a further embodiment, program 150 automatically adjusts environment and/or tool-specific settings or parameters to correct usage based on one or more subsequent classifications. In an embodiment, program 150 applies CDN 152 to streaming content to learn to identify trajectories of human hands and objects. In an embodiment, program 150 utilizes CDN 152 to separate action from objects to the streaming content to representing an accurate representation of human hands and objects. In various embodiment, program 150 repeats flowchart 200 with additional streaming content as the stream continues, where program 150 segments the stream into classifiable chunks. In these embodiments, program 150 iteratively calculates counterfactual inference results from the represented fusion of the human hands and objects.

Further Comments and/or Embodiments

Compositional action recognition is a novel challenge in the computer vision community and focuses on revealing the different combinations of verbs and nouns instead of treating subject-object interactions in videos as individual instances. Existing methods tackle this challenging task by simply ignoring appearance information or fusing object appearances with dynamic instance tracklets (e.g., fragments of a track followed by a moving object). However, those strategies usually do not perform well for unseen action instances. For that, the present invention is a novel learning framework called Counterfactual Debiasing Network (CDN) to improve the model generalization ability by removing the interference introduced by visual appearances of objects/subjects. The present invention explicitly learns the appearance information in action representations and later removes the effect of such information in a causal inference manner. Specifically, the present invention utilizes tracklets and video content to model the factual inference by considering both appearance information and structure information. In contrast, only video content with appearance information is leveraged in the counterfactual inference. With the two inferences, the present invention conducts a causal graph which captures and removes the bias introduced by the appearance information by subtracting the result of the counterfactual inference from that of the factual inference. In doing so, the present invention (i.e., CDN) better recognizes unseen action instances by debiasing the effect of appearances. Extensive experiments on the Something-Else dataset clearly show the effectiveness of CDN over existing state-of-the-art methods.

Action recognition has been receiving much attention in computer vision area for many years. Benefited from the distribution learning power of deep networks, mainstream action recognition models attempt to learn effective representations of observed dynamic actions from videos. However, with existing art it is still difficult to recognize a seen action when facing never seen objects. In the setting of this task, combinations of an action and instances are not overlapped in the training set and the test set as shown in FIG. 3. For existing action recognition methods, compositional action recognition is still an open issue due to relying heavily on the correlation between the visual features and the prediction results which learned by data-driven methods. When instances and actions in given test samples combine in a way that the model has not seen before, a model will tend to give the wrong prediction results based on the prior distribution of the seen visual clues.

Existing art tackles the challenge by breaking the object appearance dependency when learning a dynamic interaction, inhibiting the co-occurrence bias in the same action with distinct objects. By capturing the instance tracklet of an action (a continuous set of bounding boxes coordinates), Spatial-Temporal Interaction Network achieves comparable performance against convolutional neural networks trained for video classification (e.g., I3D). But the strategy excusably fails when actions are associated more with the changes in terms of the intrinsic property of an object, such as "poking" and "tearing". Besides, there is another line of works insisting that visual information contains effective cues for compositional action recognition. Based on attention mechanism or the auxiliary prediction task, fusing appearance information and structure information brings observed improvements. However, the potential risk of appearance interference has not been solved positively in these fusion methods.

Figure 4:
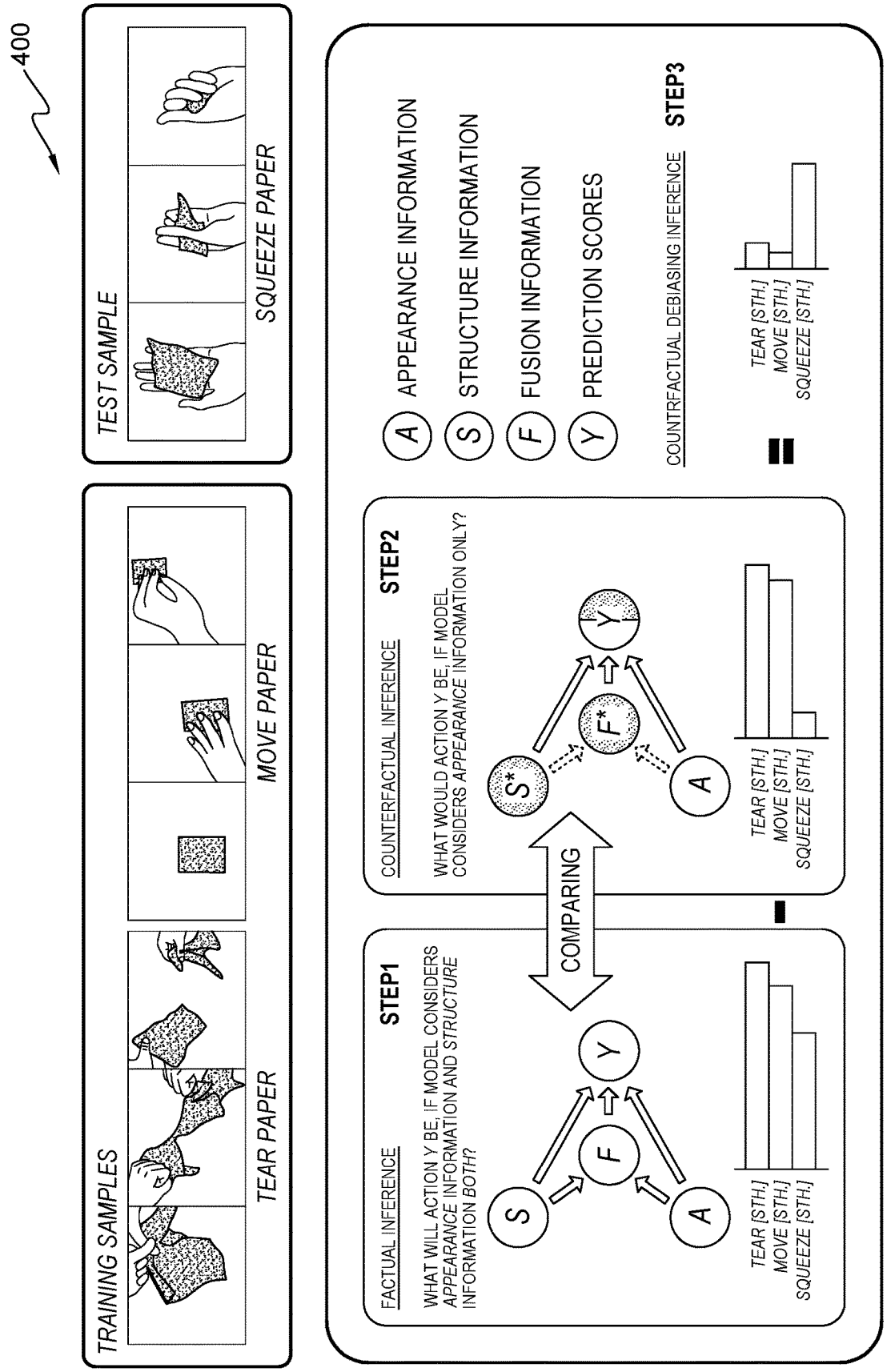
FIG. 4 depicts an illustrative embodiment of the program within the computational environment of FIG. 1, in accordance with an embodiment of the present invention.

To address the aforementioned problems, the present invention proposes a novel framework called Counterfactual Debiasing Network (CDN) to explicitly control the effect of instance appearance for compositional action recognition. The present invention recognizes that the instance appearance contains both beneficial and harmful cues for compositional action recognition. As a result, the traditional appearance dependency decreasing methods or the appearance fusing methods cannot effectively handle this issue. The present invention recognizes that counterfactual debiasing inference offers a rational way to address such situation. Based on the counterfactual debiasing inference, the present invention recognizes that action knowledge learned from instance appearance can be divided into two components in the causal graph. One is the bias which can be represented by the direct effect of appearance information, and the other is an effective cue that can be captured by the indirect effect through fusion information on final prediction results. With this perspective, the present invention proposes a counterfactual debiasing inference framework to perform unbiased action prediction for compositional action recognition. By conducting counterfactual debiasing inference on the causal graph, the present invention removes natural direct effect from total effect. More specifically, in the training stage, the classification result of the model comes from the joint contribution of appearance information A, structure information S, and fusion information F. While in the test phase, as illustrated in FIG. 4, the present invention has the ability of counterfactual analysis so that a more accurate classification result can be gained by comparing factual inference outcome and counterfactual inference outcome: Factual Inference: What will action be, if a model observes appearance information, structure information and fusion information of the above two? Counterfactual Inference: What would action be, if model observes appearance information, but had not observed structure information and fusion information?

To be specific, as shown in FIG. 4, given a test video with the ground truth label [squeeze something], the present invention first makes factual inference to predict classification scores based on the observed appearance and tracklets of [paper], which is denoted as total effect. As for Total Effect (TE), scores of [tear something] and [move something] are higher than the correct answer [squeeze something] influenced by the appearance model activation. This is because instance [paper] involved in video samples with labels [tear something] and [move something] for the most samples in training set. For the second step, the present invention conducts counterfactual inference to output classification scores only based on the appearance of [paper], which can be denoted as Natural Direct Effect (NDE) on classification results. The score of the wrong answer [tear something] dominates in NDE, for the model is cheated by the unreliable correlation learned only from appearance information. At the last step, by subtracting NDE from TE, the model gives its debiased final prediction [squeeze something] by thinking twice and comparing the answers obtained from factual inference and counterfactual inference. The present invention verifies effectiveness on challenging compositional action recognition tasks. For example, the present invention using Total Indirect Effect (TIE) as criterion achieves 4.0% top-1 accuracy and 3.9% top-5 accuracy improvement over state-of-the-art performance.

The present invention recognizes that prior knowledge learned from appearance information is mixed with the spurious correlation between action and instance appearance, which badly inhibits the model's ability of action learning. The present invention removes the pure appearance effect from total effect by counterfactual debiasing inference on the present invention proposed for compositional action recognition. The present invention achieves state-of-the-art performance for compositional action recognition.

Compositional action recognition makes the combination of objects and actions disjoint between training and testing. This non-overlapping splitting leads to appearance bias becoming a major problem when learning actions. To tackle this issue, proposed Spatial-Temporal Interaction Network (STIN) to represent actions by leveraging instance bounding boxes only to model the transformation of object geometric relations in both spatial and temporal domain. STIN generalizes well over some actions associated with object movements but fails to recognize actions about the intrinsic state changes of objects. To model such more complex actions, RGB information is introduced and fused with the spatio-temporal geometric information obtained from instance bounding boxes. Existing art designs an attention mechanism to fuse this structure information from instance bounding boxes and visual information from RGB frames. Additionally, existing art fuses said information in object-level and designs an auxiliary prediction task to guide the fusion process. The present invention mitigates the appearance bias by conducting counterfactual debiasing inference based on the proposed causal graph.

Causal inference has recently inspired a wide range of works in computer vision community, which includes scene graph generation, image recognition, video analysis, fewshot learning, zero-shot learning, semantic segmentation, and vision-language tasks. Among them, the idea of counterfactual reasoning has achieved promising results and advanced towards unbiased prediction in many tasks, especially in Visual Question Answering. The present invention recognizes that the types of bias between VQA and compositional action recognition are different. For compositional action recognition, the bias in the task comes from the combination distributions of verbs and nouns. Such bias from the composition is widespread in the real world and can hardly be avoided during dataset construction. In contrast, the bias in VQA comes from the imbalanced sample distribution of the dataset. The present invention provides a new comprehension with the counterfactual debiasing inference perspective for the compositional action recognition task, for the spurious correlation exists from visual appearance when recognizing actions.

Based on the analysis on compositional action recognition datasets, the present invention recognizes that the prior knowledge learned from spurious visual correlation seriously inhibits the model ability of action learning. To solve this problem, the present invention proposes a causal graph for the compositional action recognition from the causal inference view. Then the present invention introduces how to get unbiased prediction classification results using counterfactual debiasing inference on this causal graph. Finally, a novel counterfactual debiasing inference framework for compositional action recognition is given to verify the present invention.

Appearance Bias in Compositional Action Recognition. The present invention breaks the correlation between object appearance and action categories by leveraging Cut-Mix and mixup operations on the level of instances to explore the effect of object appearance on action predictions. For instance-level CutMix, given a video sample, each object in it is cut out according to its bounding box coordinates.

Figure 5:
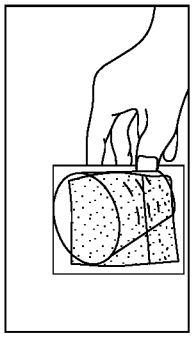
FIG. 5 depicts an illustrative table associated with the program within the computational environment of FIG. 1, in accordance with an embodiment of the present invention.
Figure 5:
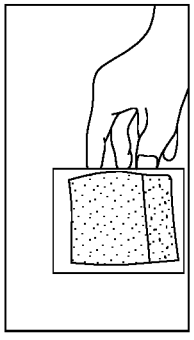
Figure 5:
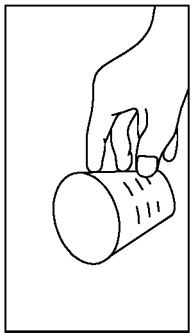

Another object is sampled from the training set randomly, then resized and pasted to this given video. Similarly, present invention leverages mixup at the instance level. Contrastingly from existing art, the present invention fixes the mixup weight as 0.5. The present invention observes significant improvements in the performance of appearance model 154 (i.e., I3D) as illustrated in FIG. 5. FIG. 5 shows that the prior action knowledge provided by objects involved in videos is mixed with the spurious correlation, which badly inhibits action learning and misleads the model to converge in this unreliable shortcut between instance appearance and action categories.

The present invention constructs a causal graph with four variables which includes instance appearance information A, action structure information S, fusion information F, and model prediction Y, which is illustrated in FIG. 6A; a directed acyclic graph $\mathcal{G}=\{\mathcal{N}, \varepsilon\}$, showing how a set of variables interact with each other through causal effect links.

The causal graph constructed by the present invention is designed for a highly generalized compositional action recognition task which imposes no constraints on the implementation details. The following is a detailed description of each node and link.

Node A (Appearance Backbone & Instance Appearance Information): A video appearance feature extractor (e.g., I3D) is fixed into this node. Given a video sample V, this node outputs video-level appearance representation A:

Input:$\{V\}\Rightarrow$Output:$\{A\}$ where A is aggregated from multiple instances' appearance feature. The appearance information of instances contains useful contextual information and bias that misleads the model. However, existing compositional action recognition methods can only choose to accept or reject appearance information. The present invention describes how to make unbiased action predictions based on the biased appearance information.

Node S (Structure Backbone & Action Structure Information): Tracklets of instances in the video are available through an object detector and a tracker. The action structure module takes tracklets of instances as input and outputs action structure information S:

Input:$\{V\}\Rightarrow$Output:$\{S\}$.

Tracklets of each instance depict how it moves and interacts with others, which are abstract and essential representation of actions and provide critical cues for correct prediction. Also, they denote unbiased information for action learning since object categories and visual information are not involved. The present invention shows that this representation of an action will achieve superior results than other state-of-the-art convolution-based video models.

Links $\{A, S\}\rightarrow F$ (Appearance and Structure Information Input for Fusion Module): Appearance information and structure information are transposed to a fusion module to generate a better video-level representation. The effectiveness of fusion between appearance information and structure information is verified where a particular attention module guides the fusion process and leads to a better generalization ability for compositional action recognition.

Node F (Fusion Module & Video Fusion Information): Given the appearance information A and the structure information S of a video, the fusion module aggregates them into the video fusion information F, which is more comprehensive than either.

Input: $\{A,S\}\Rightarrow$Output:$\{F\}$.

Different modules of fusing instance appearance information and action structure information can be applied in this node, such as bilinear pooling and attention mechanisms. In the depicted embodiment, the present invention utilizes a concatenation operation following with fully connected layers as the fusion module.

Link$\{\mathcal{A}, \mathcal{S}, \mathcal{F}\}\rightarrow \mathcal{Y}$ (Classifiers): This procedure can be formalized as:

Input:$\{A\}\Rightarrow$Output:$\{Z_a\}$,

Input:$\{S\}\Rightarrow$Output:$\{Z_s\}$,

Input:$\{F\}\Rightarrow$Output:$\{Z_f\}$, where $Z_a$, $Z_s$, and $Z_f$ are classification scores corresponding to A, S, and F mentioned above. $Z_a$ is a biased classification result, and the present invention reduces this effect caused by bias in subsequent counterfactual debiasing inferencing.

Node $\mathcal{Y}$ (Fusion Function & Action Classification Result): The final classification prediction score $Z_{a,s,f}$ is generated by fusing all activation $\{Z_a, Z_s, \text{and } Z_f\}$ using a score fusion function.

Input:$\{Z_a, Z_s, \text{and } Z_f\}\Rightarrow$Ouput:$\{Z_{a,s,f}\}$.

The present invention utilizes two fusion functions: 1) Naive Sum:

$$Z_{a,s,f}=Z_a+Z_s+Z_f$$

Log-sigmoid Sum:

$$Z_{a,s,f}=\log(\sigma(Z_a+Z_s+Z_f)),$$

where $\sigma(\cdot)$ is the sigmoid function.

The present invention presents counterfactual debiasing inference to exclude the pure instance appearance effect through A→Y to reduce appearance bias. The present invention denotes the appearance model, the structure model, and the fusion module as $M_A$, $M_S$ and $M_F$, respectively. Then the present invention utilizes the formulations below, where a is a red, green, and blue (RGB) frame input and s is a tracklet input:

$$M_A(a)=\{Z_a,f_a\},$$

$$M_S(s)=\{Z_s,f_s\},$$

$$M_F(f_a,f_s)=Z_f,$$

where $f_a$ and $f_s$ represent features extracted from the appearance and structure backbone, respectively. The final score:

$$Z_{a,s,f}=h(Z_a+Z_s+Z_f),$$

is gained by aggregating three paths activation directly connected to Y using a fusion function h.

The present invention denotes a random variable as a capital letter and represents the corresponding observed value as a lowercase letter. The lowercase letter with the superscript * represents under no-treatment control condition. For example, to recognize an action, A=a represents having observed instance appearance in this action video, then A=a* represents having not observed instance appearance.

To capture the appearance bias, the present invention observes the causal effect of direct path A→Y when blocking the activation from other pathways. However, neural networks cannot make an inference when fed with variables of the dummy value. Therefore, the present invention manually sets the output to be a zero score for brevity instead of a learnable score when the model input is a dummy value. The setting can be formalized as:

$$Z_a = \begin{cases} z_a = M_A(a) & A = a \\ z_a^* = 0 & A = a^* \end{cases},$$

$$Z_s = \begin{cases} z_s = M_S(s) & S = s \\ z_s^* = 0 & S = s^* \end{cases},$$

$$Z_a = \begin{cases} z_f = M_F(f_a, f_s) & A = a \text{ and } S = s \\ z_f^* = 0 & A = a^* \text{ or } S = s^* \end{cases},$$

Total effect denotes the effect of individual and mediator together on the outcome, which can be decomposed as the sum of direct effect and indirect effect. Total effect of A=a and S=s on the classification result Y can be represented as:

$$TE = Z_{a,s,f} - Z_{a^*,s^*,f^*},$$

where $Z_{a,s,f}$ is the inference outcome based on A=a and S=s, and $Z_{a^*,s^*,f^*}$ is the inference outcome based on A=a* and S=s*. According to the present invention's causal graph, the effect of appearance information A on classification result Y can be divided into direct effect A→Y and indirect effect A→F→Y. Counterfactual debiasing inference aims for blocking the direct effect A→Y while retaining the indirect effect A→F→Y. In this way, the present invention achieves removing the bias while keeping the good context cue in appearance information. Natural direct effect denotes the effect of an individual on the outcome with the blocked mediator. The direct effect of appearance information can be captured using natural direct effect (NDE):

$$NDE = Z_{a,s^*,f^*} - Z_{a^*,s^*,f^*}.$$

Figure 6B:
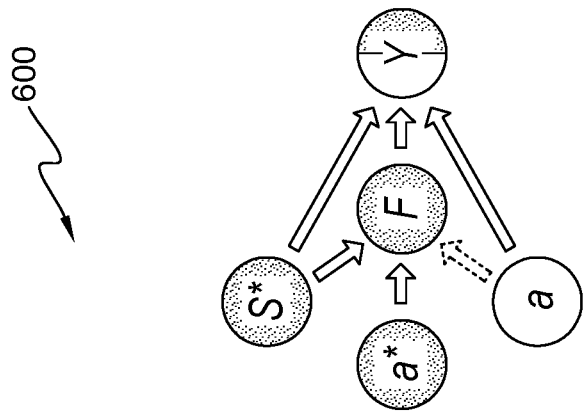
FIGS. 6A and 6B depict an illustrative graph associated with the program within the computational environment of FIG. 1, in accordance with an embodiment of the present invention.
Figure 6A:
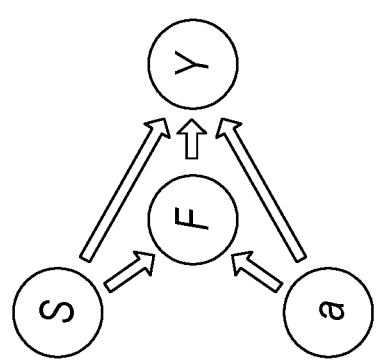

Finally, by doing a simple minus calculation as shown in FIG. 6B, the present invention subtracts counterfactual inference outcome NDE from factual inference outcome TE to eliminate visual bias and obtain a more reasonable and accurate result, total indirect effect (TIE):

$$TIE = TE - NDE = Z_{a,s,f} - Z_{a,s^*,f^*}.$$

In the present invention, a hyperparameter α controls the proportion of NDE that the present invention removes from TE. The present invention formalizes the implementation of TIE as follows:

$$TIE = Z_{a,s,f} - \alpha \cdot Z_{a,s^*,f^*}.$$

The present invention selects the classification result with the highest TIE, which is different from the traditional method based on the posterior possibility.

The present invention proposes a framework CDN 152 with implementations based on the built causal graph. The present invention recognizes that due to the causal graph and model framework, other modules can be embedded into the CDN 152 so long as the corresponding output has the same semantic information.

Without loss of generality, the present invention implements the models below as simply as possible. For the appearance model, the present invention utilizes I3D as a feature extractor backbone because of its generality and simplicity. With the guidance of instance bounding boxes annotated or detected in each video frame, instance-level appearance features can be gained by using RoI-pooling. The present invention generates video-level action appearance feature by average pooling all instance appearance features in both spatial and temporal space. The present invention adopts the similar way that takes instance bounding box coordinates and its identity embedding as input and feeds them into fully connected layers to obtain instance-centric representation. The present invention generates frame-level representation through performing pair-wise reasoning between instances at each frame and aggregate these frame descriptors in the temporal domain to get the video-level action structure feature. The present invention utilizes a concatenation operation followed with a multilayer perceptron (MLP) as the fusion module.

In training stage, the present invention adds two auxiliary loss items into CDN 152 to stabilize the causal influence of each independent branch. Without these auxiliary loss items, CDN 152 tends to converge to a single branch which converges fastest. That would lead other branch activation to output meaningless perturbations. The whole loss function can be formalized as follow:

$$\mathcal{L} = \mathcal{L}_F(a,s,f) + \mathcal{L}_A(a) + \mathcal{L}_S(s),$$

where $\mathcal{L}_F(a, s, f)$, $\mathcal{L}_A(a)$, and $\mathcal{L}_S(s)$ are cross-entropy losses over $Z_{a,s,f}$, $Z_a$, and $Z_s$. During inference stage, the present invention utilizes the outcome of counterfactual debiasing inference, total indirect effect, as the criterion.

The present invention validates on the Something-Else task (i.e., compositional action recognition task), following a compositional data split setting. The Something-Else task defines a subset of frequent object categories (appearing in more than 100 videos in the dataset) and splits it into two disjoint groups, A and B. The total 174 action categories are divided into two groups (1 and 2) as well. According to the splits of groups, each video in the Something-Else dataset will be assigned as one of 1A, 1B, 2A, 2B. Then the training set is a collection of 1A+2B and the validation set is 1B+2A. As a result, there are 112,795 videos (54,919 for training and 57,876 for validation) with the compositional setting.

The present invention samples 16 frames for RGB input and 8 frames for bounding box tracklets input. The present invention utilizes ground-truth bounding boxes annotations. I3D is selected as the backbone of the appearance model and initialized with Kinetics-400 (i.e., collection of large-scale, high-quality datasets of URL links of up to 650,000 video clips that cover 400/600/700 human action classes) pre-trained weights. The dimension of both video appearance feature and structure feature is d=512. The structure model of the present invention is trained for 30 epochs with a learning rate 0.01 using SGD with 0.0001 weight decay and 0.9 momentum, the learning rate is decayed by the factor of 10 at epochs 24. The learning rate of the appearance model in CDN 152 is set to 0.6 times that of the structure model. The present invention sets a batch size of 16.

The present invention compares CDN with the recent methods in the following: I3D: Applying 3D convolution over RGB frames to obtain action representations. STIN: Leveraging instance bounding boxes and category information to represent instances and performing spatial-temporal interaction to model the geometric relation transformation of actions. SAFCAR: A two-branch model takes RGB frames and instance tracklets as input and fuses the two-branch information with an attention module. Interactive Fusion: Fusing information from appearance and tracklets information in object-level and designing an auxiliary prediction task to guide the fusion process to represent actions. CDN 152 w/o CF: A basic version of our approach with the Log-sigmoid Sum fusion function using the traditional posterior probability as criterion. In an embodiment, counterfactual debiasing inference is not used in this basic version. CDN 152: The present invention utilizes a Log-sigmoid Sum fusion function using total indirect effect observed from the difference between factual inference results and counterfactual inference results as criterion.

FIG. 8A shows the input information and overall architectures of existing compositional action recognition models. FIG. 8B shows a brief training and test pipeline of the present invention (program 150 and CDN 152).

As shown in FIG. 9A, methods that use the appearance and structure information both within an action outperform than those processing only the single one, which means that instance appearance information brings prior knowledge for compositional action recognition. Based on the causal graph, the present invention (i.e., program 150) achieves slightly higher performance than baseline methods by using traditional posterior probability as the criterion. After applying counterfactual debiasing inference, CDN 152 improves its prediction accuracy on Top-1 (1.7%) and Top-5 (0.9%) by using total indirect effect as the criterion. This shows that counterfactual debiasing inference could mitigate the bias and keep effective cues in appearance information by only adopting a minor modification during the test stage. Overall, the complete result of the present invention outperforms state-of-the-art performance with a noticeable margin.

Fusion function: The score fusion function is an indispensable part instead of an ensemble trick for CDN. Both the factual and counterfactual outcomes are calculated by the fusion function. Therefore, the model cannot give any output when using CF without the fusion function. For reference, the present invention provides the performance of each single model without fusion function and CF as shown in FIG. 9B. The present invention utilizes Naive Sum and Log-sigmoid Sum respectively to generate the final prediction results. The present invention only substitutes Naïve Sum function with Log-sigmoid Sum function, leading to a performance improvement. This suggests that the selection of score fusion function has a great impact on the final prediction results.

Effect of different TIE parameter a: The hyperparameter a used in the present invention implementation controls the trade-off between total indirect effect and total effect. The higher value of $\alpha$, the less dependent on appearance information of model prediction results.

When $\alpha$ equals 0, total indirect effect on classification results Z degenerates into total effect, which is equivalent to results gained from traditional inference strategies based on posterior probability. As $\alpha$ increases from 0 to 1, the performance of CDN 152 first increases and drops down around $\alpha=0.7$ as shown in FIG. 10. Here, the present invention selects $\alpha=0.5$ for Log-sigmoid Sum score fusion function and $\alpha=0.7$ for Naive Sum.

By searching for a proper value of $\alpha$, CDN 152 succeeds in mitigating the bias while keeping the good context in appearance information. This further illustrates that a compromise between learning action knowledge from visual information and totally discarding visual cues is the most reasonable solution for compositional action recognition.

Figure 11:
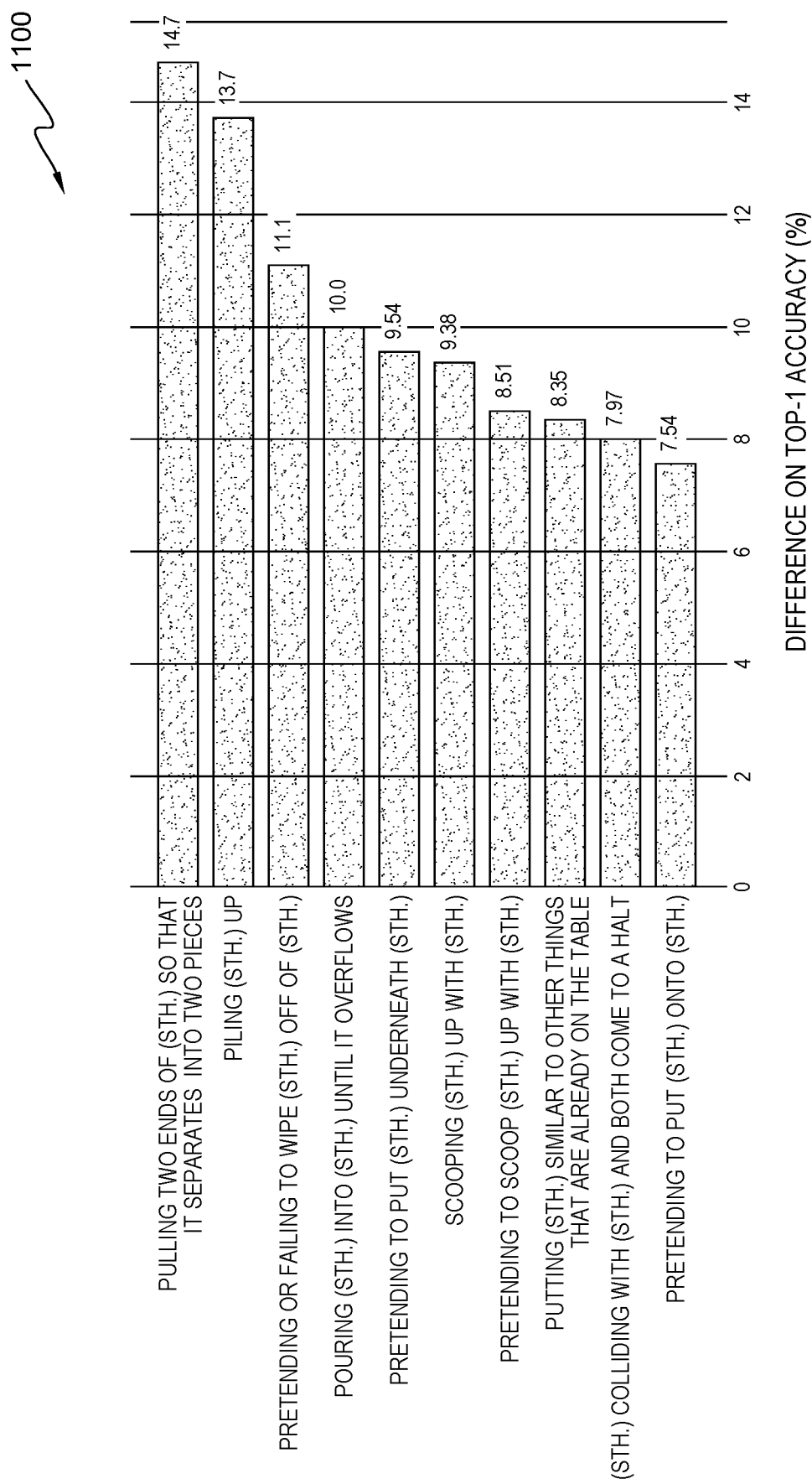
FIG. 11 illustrate graphs associated with the program within the computational environment of FIG. 1, in accordance with an embodiment of the present invention.

Category Analysis: The present invention compares the accuracy improvement on individual action categories when applying counterfactual debiasing inference on CDN 152. As illustrated in FIG. 11, actions that are more associated with instance appearance information benefit a lot from our counterfactual analysis. For example, [pulling two ends of something so that it separates into two pieces] depicts a situation where objects appearance changing much, from a whole instance into two pieces. [pouring something into sth. until it overflows] describes a scenario where liquid such as water and milk flows out of a container.

The present invention recognizes that a spurious correlation between instance appearance and action category exists, which badly inhibits action learning. To solve this problem, the present invention presents a novel counterfactual framework for compositional action recognition to provide an elegant solution for blocking the shortcut that the model learned from pure vision bias. With the help of counterfactual inferencing, the present invention captures the pure appearance direct effect on classification scores, which is subtracted from total effect on the predictions. The present invention validates this approach on the Something-Else dataset, and a new state-of-the-art performance is established by unbiased inference on the model framework of the present invention.

FIG. 3 depicts example 300, in accordance with an illustrative embodiment of the present invention. Example 300 contains examples of non-overlapping object-action compositions. For example, appearance model 154 (i.e., action model) never sees [squeezing paper] during training but sees [paper] occurred in action [poking]. Thus, the action model gives prediction [poking] according to the object correlation instead of [squeezing] according to the action correlation when being tested with sample [squeezing paper].

FIG. 4 depicts example 400, in accordance with an illustrative embodiment of the present invention. Example 400 demonstrates counterfactual debiasing inference for compositional action recognition. Factual inference depicts the actual situation where the CDN 152 considers appearance information (e.g., RGB frames), structure information (e.g., tracklets), and aggregated fusion information to give a prediction. Counterfactual inference depicts the virtual scenario where CDN 152 considers only appearance information. Total indirect effect used as the criterion is obtained by subtracting natural direct effect from total effect.

FIG. 5 depicts table 500, in accordance with an illustrative embodiment of the present invention. Table 500 demonstrates the performance of I3D with instance-level mixing. FIG. 5 shows that the prior action knowledge provided by objects involved in videos is mixed with the spurious correlation, which inhibits action learning and misleads the model to converge in this unreliable shortcut between instance appearance and action categories.

FIGS. 6A and 6B depict casual graph 600, in accordance with an illustrative embodiment of the present invention. Casual graph 600 comprises S: structure information; A: appearance information; F: fusion information; and Y: prediction scores. FIG. 6A depicts a casual graph illustration for compositional action recognition. FIG. 6B depicts a casual graph illustration for counterfactual analysis between factual inference outcome and counterfactual inference outcome given a video sample and corresponding observed values a and s. Lighter nodes denote real value input while darker nodes denote dummy value inputs.

Figure 7:
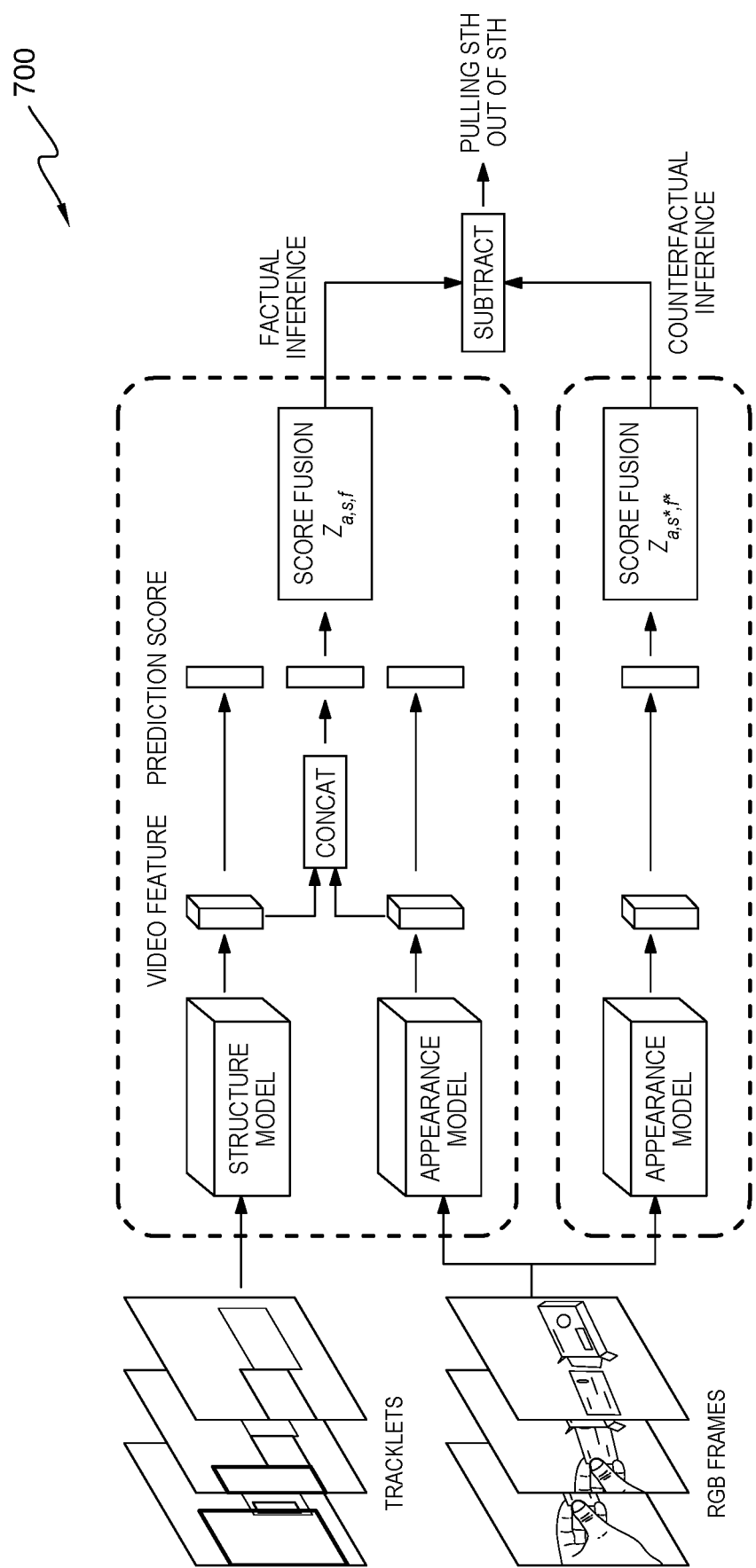
FIG. 7 illustrates operational steps of the program within the computational environment of FIG. 1, in accordance with an embodiment of the present invention.

FIG. 7 depicts CDN 700, in accordance with an illustrative embodiment of the present invention. CDN 700 demonstrates an overview of program 150 and, comprised, CDN 152, with no strict requirements in the specific implementation of structure model 156 and appearance model 154. The factual outcome is score fusion function's activation based on three branches. The counterfactual outcome is score fusion function's activation based on appearance branch and two zero value as placeholders.

FIGS. 8A and 8B depict frameworks 800A and 800B, in accordance with an illustrative embodiment of the present invention. Frameworks 800A and 800B comprise a plurality of compositional action recognition frameworks. FIG. 8A demonstrates existing frameworks for compositional action recognition. FIG. 8B depicts a three-branch framework is designed corresponding to the present invention (e.g., generated causal graph). Here, the debiased effect is set as a criterion contrasting against traditional posterior probability.

FIGS. 9A and 9B depict tables 900, in accordance with an illustrative embodiment of the present invention. Tables 900 depict a plurality of tables containing experimental results. FIG. 9A depicts recognition accuracy comparison results against state-of-the-art methods. FIG. 9A demonstrates that, based on the causal graph, the present invention (CDN 152) achieves slightly higher performance than baseline methods by using traditional posterior probability as the criterion. After applying counterfactual debiasing inference, CDN 152 improves its prediction accuracy on Top-1 (1.7%) and Top-5 (0.9%) by using total indirect effect as the criterion. FIG. 9A shows that counterfactual debiasing inference could mitigate the bias and keep effective cues in appearance information by only adopting a minor modification during the test stage. FIG. 9A demonstrates the complete result of the present invention outperforming state-of-the-art performance with a noticeable margin. FIG. 9B depicts ablation of fusion function effectiveness on CDN 152. FIG. 9B provides the performance of each single model without fusion function and CF. FIG. 9B demonstrates that the selection of score fusion function has a great impact on the final prediction results.

FIG. 10 depicts graphs 1000, in accordance with an illustrative embodiment of the present invention. Graphs 1000 demonstrates a plurality of graphs, each depicting accuracies associated with Naive Sum and Log-sigmoid Sum methods with different TIE weights. Graphs 1000 demonstrates that the higher value of α, the less dependent on appearance information of model prediction results. In addition, when α equals 0, total indirect effect on classification results Z degenerates into total effect, which is equivalent to results gained from traditional inference strategies based on posterior probability. FIG. 10 also shows that as α increases from 0 to 1, the performance of CDN 152 first increases and drops down around α=0.7. Here, the present invention selects α=0.5 for Log-sigmoid Sum score fusion function and α=0.7 for Naive Sum.

FIG. 11 depicts graph 1100, in accordance with an embodiment of the present invention. Graph 1100 depicts a top 10 graph of action categories on which counterfactual debiasing inference exceeds traditional inference. For example, [pulling two ends of something so that it separates into two pieces] depicts a situation where objects appearance changing much, from a whole instance into two pieces. [pouring something into sth. until it overflows] describes a scenario where liquid such as water and milk flows out of a container.

Figure 12:
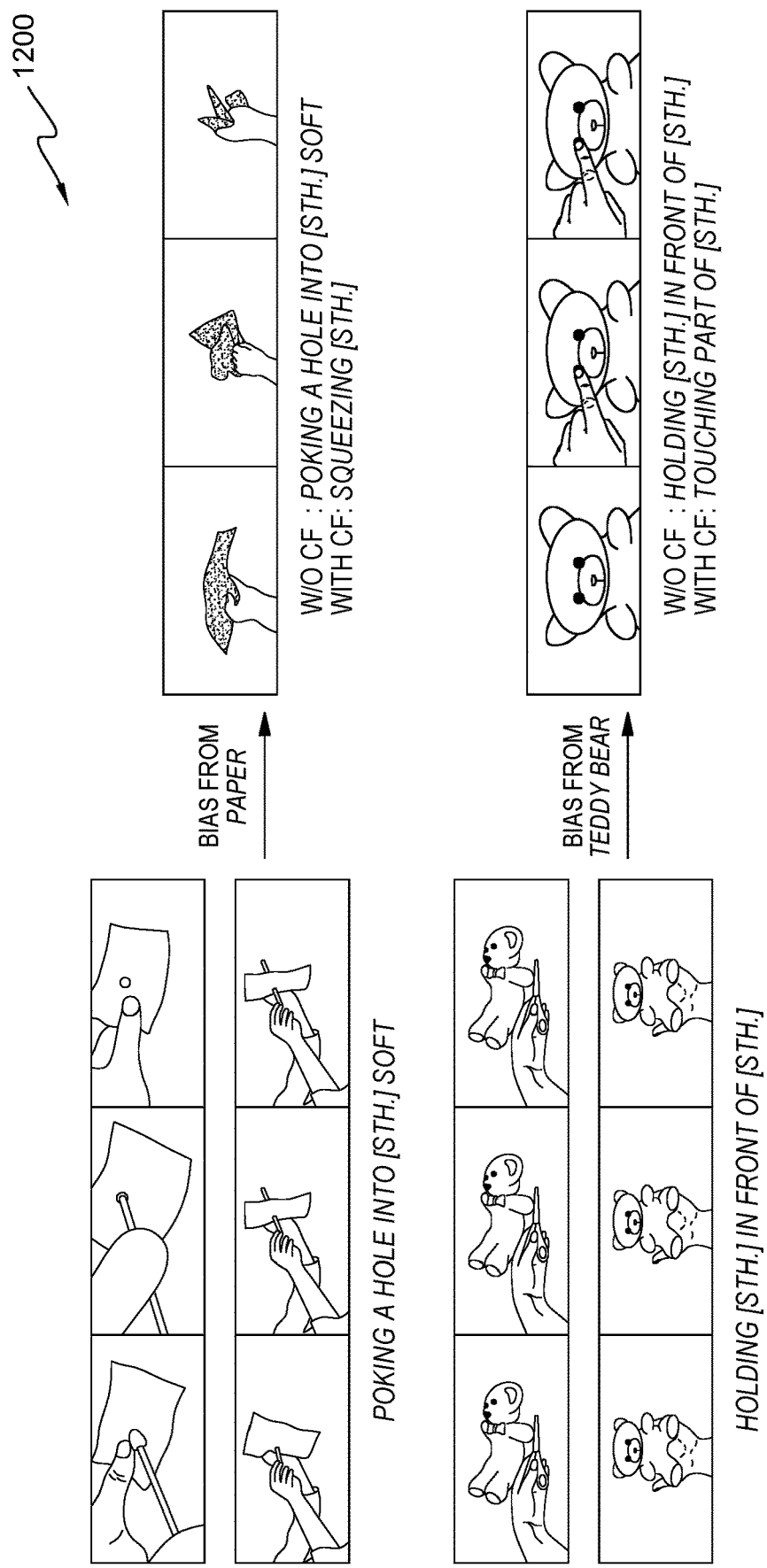
FIG. 12 depicts exemplary embodiments associated with the program within the computational environment of FIG. 1, in accordance with an embodiment of the present invention.

FIG. 12 depicts example 1200, in accordance with an embodiment of the present invention. Example 1200 illustrates how program 150 applies counterfactual debiasing inference. With cf represents applying counterfactual inference while w/o cf represents not applying counterfactual inference. The false and correct predictions are listed from top to bottom, respectively. For example, [paper] is shared by action [squeezing something] in test and action [poking a hole into something soft] in training. Three objects occurring in [poking a hole into something soft] most frequently are [paper], [pillow], and [bread], accounting for 29.7%, 26.6%, and 9.4% respectively. This verifies the action [poking a hole into something soft] is biased due to the high object correlation with [paper] and [pillow]. Therefore, the correlation between [paper] appearance and action [poking a hole into something soft] learned from the training set misleads the model to give a wrong prediction classification result if the present invention utilizes posterior probability as the criterion. However, CDN 152 overcomes its biased prior distribution learned from the dataset with counterfactual debiasing inference. A correct answer can be given since it does not rely on the shortcut provided by spurious appearance correlation through subtracting the biased classification results from the total effect.

Figure 13:
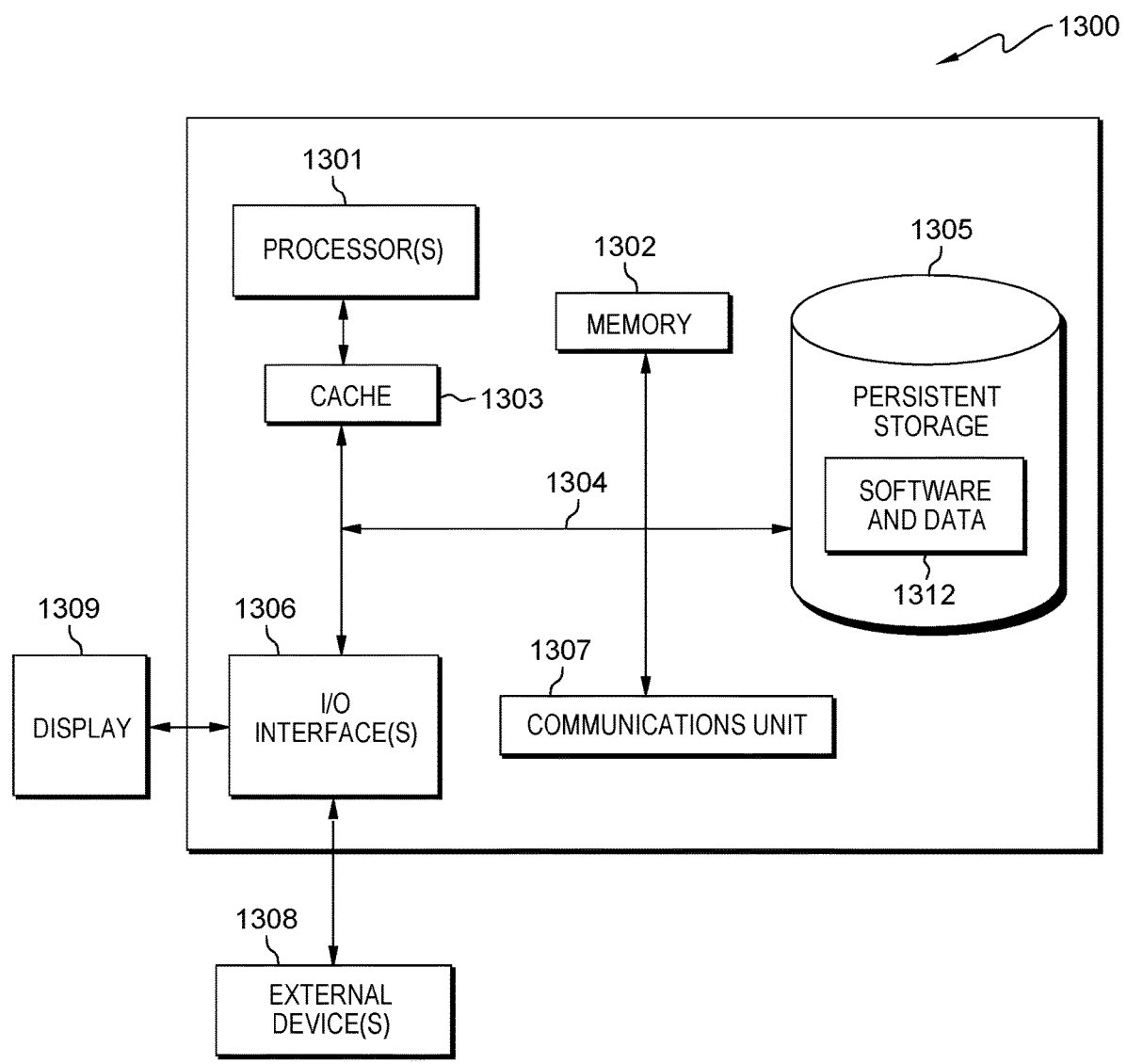
FIG. 13 is a block diagram of components of the server computer, in accordance with an embodiment of the present invention.

FIG. 13 depicts block diagram 1300 illustrating components of server computer 120 in accordance with an illustrative embodiment of the present invention. It should be appreciated that FIG. 13 provides only an illustration of one implementation and does not imply any limitations with regard to the environments in which different embodiments may be implemented. Many modifications to the depicted environment may be made.

Server computer 120 each include communications fabric 1304, which provides communications between cache 1303, memory 1302, persistent storage 1305, communications unit 1307, and input/output (I/O) interface(s) 1306. Communications fabric 1304 can be implemented with any architecture designed for passing data and/or control information between processors (such as microprocessors, communications, and network processors, etc.), system memory, peripheral devices, and any other hardware components within a system. For example, communications fabric 1304 can be implemented with one or more buses or a crossbar switch.

Memory 1302 and persistent storage 1305 are computer readable storage media. In this embodiment, memory 1302 includes random access memory (RAM). In general, memory 1302 can include any suitable volatile or non-volatile computer readable storage media. Cache 1303 is a fast memory that enhances the performance of computer processor(s) 1301 by holding recently accessed data, and data near accessed data, from memory 1302.

Program 150 may be stored in persistent storage 1305 and in memory 1302 for execution by one or more of the respective computer processor(s) 1301 via cache 1303. In an embodiment, persistent storage 1305 includes a magnetic hard disk drive. Alternatively, or in addition to a magnetic hard disk drive, persistent storage 1305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1305 may also be removable. For example, a removable hard drive may be used for persistent storage 1305. Other examples include optical and magnetic disks, thumb drives, and smart cards that are inserted into a drive for transfer onto another computer readable storage medium that is also part of persistent storage 1305. Software and data 1312 can be stored in persistent storage 1305 for access and/or execution by one or more of the respective processors 1301 via cache 1303.

Communications unit 1307, in these examples, provides for communications with other data processing systems or devices. In these examples, communications unit 1307 includes one or more network interface cards. Communications unit 1307 may provide communications through the use of either or both physical and wireless communications links. Program 150 may be downloaded to persistent storage 1305 through communications unit 1307.

I/O interface(s) 1306 allows for input and output of data with other devices that may be connected to server computer 120. For example, I/O interface(s) 1306 may provide a connection to external device(s) 1308, such as a keyboard, a keypad, a touch screen, and/or some other suitable input device. External devices 1308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 1305 via I/O interface(s) 1306. I/O interface(s) 1306 also connect to a display 1309.

Display 1309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    improving, by one or more computer processors, action recognition by removing inference introduced by visual appearances of objects within a received video segment, comprising:
        extracting, by one or more computer processors, appearance information and structure information from the received video segment;
        calculating, by one or more computer processors, a factual inference (TE) for the received video segment utilizing the extracted appearance information and structure information;
        calculating, by one or more computer processors, a counterfactual debiasing inference (NDE) for the received video segment;
        calculating, by one or more computer processors, a total indirect effect (TIE) by subtracting the calculated counterfactual debiased inference from the calculated factual inference; and
        classifying, by one or more computer processors, the received video segment by selecting a classification result associated with a highest calculated TIE.

2. The computer-implemented method of claim 1, wherein calculating the factual inference, comprises:
    transposing, by one or more computer processors, appearance information and structure information into a fusion module;
    generating, by one or more computer processors, a first prediction score utilizing a structure model inputted with structure information;
    generating, by one or more computer processors, a second prediction score utilizing an appearance model inputted with appearance information;
    generating, by one or more computer processors, a third prediction score utilizing the transposed appearance and structure model utilizing the fusion module; and
    fusing, by one or more computer processors, the first, second, and third prediction scores to create the factual inference.

3. The computer-implemented method of claim 1, wherein calculating the factual inference, comprises:

constructing, by one or more computer processors, a casual graph comprising instance appearance information, structure information, fusion information, and a model prediction.

4. The computer-implemented method of claim 1, wherein calculating the counterfactual inference only considers RBG frames excluding structural information.

5. The computer-implemented method of claim 1, wherein the counterfactual inference is constructed from a causal graph.

6. The computer-implemented method of claim 1, further comprising:
    adjusting, by one or more computer processors, a hyperparameter to control a proportion of NDE that is removed from TE.

7. The computer-implemented method of claim 3, wherein the casual graph is a directed acyclic graph.

8. A computer program product comprising:
    one or more computer readable storage media and program instructions stored on the one or more computer readable storage media, the stored program instructions comprising:
    program instructions to improve action recognition by removing inference introduced by visual appearances of objects within a received video segment, comprising:
        program instructions to extract appearance information and structure information from a received video segment;
        program instructions to calculate a factual inference (TE) for the received video segment utilizing the extracted appearance information and structure information;
        program instructions to calculate a counterfactual debiasing inference (NDE) for the received video segment;
        program instructions to calculate a total indirect effect (TIE) by subtracting the calculated counterfactual debiased inference from the calculated factual inference; and
        program instructions to action recognize the received video segment by selecting a classification result associated with a highest calculated TIE.

9. The computer program product of claim 8, wherein the program instructions to calculate the factual inference, comprise:
    program instructions to transpose appearance information and structure information into a fusion module;
    program instructions to generate a first prediction score utilizing a structure model inputted with structure information;
    program instructions to generate a second prediction score utilizing an appearance model inputted with appearance information;
    program instructions to generate a third prediction score utilizing the transposed appearance and structure model utilizing the fusion module; and
    program instructions to fuse the first, second, and third prediction scores to create the factual inference.

10. The computer program product of claim 8, wherein the program instructions to calculate the factual inference, comprise:
    program instructions to construct a casual graph comprising instance appearance information, structure information, fusion information, and a model prediction.

11. The computer program product of claim 8, wherein the program instructions to calculate the counterfactual inference only considers RBG frames excluding structural information.

12. The computer program product of claim 8, wherein the counterfactual inference is constructed from a causal graph.

13. The computer program product of claim 8, wherein the program instructions, stored on the one or more computer readable storage media, further comprise:
   program instructions to adjust a hyperparameter to control a proportion of NDE that is removed from TE.

14. The computer program product of claim 10, wherein the casual graph is a directed acyclic graph.

15. A computer system comprising:
   one or more computer processors;
   one or more computer readable storage media; and
   program instructions stored on the computer readable storage media for execution by at least one of the one or more processors, the stored program instructions comprising:
      program instructions to improve action recognition by removing inference introduced by visual appearances of objects within a received video segment, comprising:
         program instructions to extract appearance information and structure information from a received video segment;
         program instructions to calculate a factual inference (TE) for the received video segment utilizing the extracted appearance information and structure information;
         program instructions to calculate a counterfactual debiasing inference (NDE) for the received video segment;
         program instructions to calculate a total indirect effect (TIE) by subtracting the calculated counterfactual debiased inference from the calculated factual inference; and
         program instructions to action recognize the received video segment by selecting a classification result associated with a highest calculated TIE.

16. The computer system of claim 15, wherein the program instructions to calculate the factual inference, comprise:
   program instructions to transpose appearance information and structure information into a fusion module;
   program instructions to generate a first prediction score utilizing a structure model inputted with structure information;
   program instructions to generate a second prediction score utilizing an appearance model inputted with appearance information;
   program instructions to generate a third prediction score utilizing the transposed appearance and structure model utilizing the fusion module; and
   program instructions to fuse the first, second, and third prediction scores to create the factual inference.

17. The computer system of claim 15, wherein the program instructions to calculate the factual inference, comprise:
   program instructions to construct a casual graph comprising instance appearance information, structure information, fusion information, and a model prediction.

18. The computer system of claim 15, wherein the program instructions to calculate the counterfactual inference only considers RBG frames excluding structural information.

19. The computer system of claim 15, wherein the counterfactual inference is constructed from a causal graph.

20. The computer system of claim 15, wherein the program instructions, stored on the one or more computer readable storage media, further comprise:
   program instructions to adjust a hyperparameter to control a proportion of NDE that is removed from TE.

* * * * *